US012672015B2

(12) United States Patent
Zhu et al.

(10) Patent No.: US 12,672,015 B2
(45) Date of Patent: Jun. 30, 2026

(54) METHODS AND DEVICES FOR BASE STATION

(71) Applicant: Telefonaktiebolaget LM Ericsson (publ), Stockholm (SE)

(72) Inventors: Yanyan Zhu, Beijing (CN); Huaisong Zhu, Beijing (CN); Jiyan Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 18/039,696

(22) PCT Filed: Dec. 14, 2020

(86) PCT No.: PCT/CN2020/136019
§ 371 (c)(1),
(2) Date: May 31, 2023

(87) PCT Pub. No.: WO2022/126301
PCT Pub. Date: Jun. 23, 2022

(65) Prior Publication Data
US 2024/0049013 A1      Feb. 8, 2024

(51) Int. Cl.
*H04W 24/08*          (2009.01)
(52) U.S. Cl.
CPC .................................. *H04W 24/08* (2013.01)
(58) Field of Classification Search
CPC ..... H04W 16/28; H04W 24/02; H04W 24/06; H04W 24/08; H04W 36/322; H04W 36/362; H04W 76/19
See application file for complete search history.

(56) References Cited

U.S. PATENT DOCUMENTS

| | | | |
|---|---|---|---|
| 9,585,045 B2 | 2/2017 | Lee et al. | |
| 10,833,762 B2 | 11/2020 | Liu et al. | |
| 2012/0176939 A1 | 7/2012 | Qu et al. | |
| 2013/0322349 A1 | 12/2013 | Hosangadi et al. | |
| 2019/0058532 A1* | 2/2019 | Nagaraja ............. | H04W 56/001 |

(Continued)

FOREIGN PATENT DOCUMENTS

| | | |
|---|---|---|
| CN | 104584619 A | 4/2015 |
| CN | 110476442 A | 11/2019 |
| WO | 2020014107 A1 | 1/2020 |

OTHER PUBLICATIONS

International Search Report and Written Opinion of the International Searching Authority, PCT/CN2020/136019, mailed Sep. 13, 2021, 9 pages.

(Continued)

*Primary Examiner* — Michael Thier
*Assistant Examiner* — Prince A Mensah
(74) *Attorney, Agent, or Firm* — Sage Patent Group

(57)          ABSTRACT

The present disclosure provides a method for a Base Station (BS) in a communication network is provided. The method includes: obtaining channel quality information sent from a User Equipment (UE), and in response to determining that the UE is in poor coverage according to the channel quality information, configuring the UE to perform downlink measurements on at least one downlink RLM measurement source in accordance with measurement configurations. The corresponding devices, computer readable storage medium, carrier, etc. thereof are also provided.

20 Claims, 7 Drawing Sheets

(56)                           References Cited

U.S. PATENT DOCUMENTS

2019/0393969 A1*  12/2019  Kim ..................... H04B 17/318
2020/0196175 A1*   6/2020  Yang .................... H04L 5/0055
2020/0252821 A1*   8/2020  Deogun ............... H04W 76/19
2022/0191762 A1*   6/2022  Huang ................. H04W 36/30

OTHER PUBLICATIONS

Ericsson, "Discussions on UE power saving for RLM and BM," 3GPP TSG-RAN WG4 Meeting #97-e, R4-2016150, Electronic Meeting, Nov. 2-13, 2020, 4 pages.
Apple, "Feasibility and performance impact of RLM/BFD relaxation," 3GPP TSG-RAN WG4 Meeting #97-e, R4-2014219, Electronic Meeting, Nov. 2-13, 2020, 3 pages.
3GPP TS 36.331 v15.12.0 (Dec. 2020); 3rd Generation Partnership Project; Technical Specification Group Radio Access Network; Evolved Universal Terrestrial Radio Access (E-UTRA); Radio Resource Control (RRC); Protocol specification (Release 15); 965 pages.
2GPP TS 37.340 v15.11.0 (Dec. 2020); 3rd Generation Partnership Project; Technical Specification Group Radio Access Network; Evolved Universal Terrestrial Radio Access (E-UTRA) and NR; Multi-connectivity; Stage 2 (Release 15); 71 pages.
3GPP TS 38.214 v15.11.0 (Sep. 2020); 3rd Generation Partnership Project; Technical Specification Group Radio Access Network; NR; Physical layer procedures for data (Release 15); 106 pages.
3GPP TS 38.331 v15.12.0 (Dec. 2020); 3rd Generation Partnership Project; Technical Specification Group Radio Access Network; NR; Radio Resource Control (RRC) protocol specification (Release 15); 541 pages.
Extended European Search Report mailed Jul. 15, 2024 for European Patent Application No. 20965322.9, 9 pages.

\* cited by examiner

Measurement Timing

METHODS AND DEVICES FOR BASE STATION

CROSS REFERENCE TO RELATED APPLICATIONS

This application is a 35 U.S.C. § 371 national stage application of PCT International Application No. PCT/CN2020/136019 filed on Dec. 14, 2020, the disclosure and content of which is incorporated by reference herein in its entirety.

TECHNICAL FIELD

The present disclosure generally relates to the technical field of telecommunications, and more specifically to methods, network elements, devices, computer-readable storage and carrier, etc. for a base station with respect to radio resource management measurements.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The Long-Term Evolution (LTE) wireless system developed by the 3rd-Generation Partnership Project (3GPP) is a widely deployed fourth-generation wireless communications system. In LTE and its predecessor systems, the purpose of the Radio Link Monitoring (RLM) function in a wireless device, referred to in 3GPP documentation as a "user equipment." or "UE", is to monitor the downlink radio link quality of the serving cell in RRC_CONNECTED state. This monitoring may be based on Cell-Specific Reference Signals (CRS), which are always associated to a given LTE cell and are derived from the Physical Cell Identifier (PCI).

New Radio (NR) is expected to be an ultra-lean system, which implies the minimization of always-on transmissions, aiming for an energy efficient future-proof system. The NR design is supposed to strive for maximizing the amount of time and frequency resources that can be flexibly utilized or that can be left blanked without causing backward compatibility issues in the future. Blank resources can be used for future use. The NR design is also supposed to strive for minimizing transmission of always-on signals and confining signals and channels for physical layer functionalities (signals, channels, signaling) within a configurable/allocable time/frequency resource.

As described above, however, RLM in LTE may be based on CRSs, a wide band signal transmitted in all subframes. A major consequence of the lean-design principle with respect to the RLM design in NR is that there is a wish to avoid the design of a wide band signals transmitted in all subframes. Therefore, lean design will prohibit the usage of the LTE solution for RLM in NR. With regard to RLM handing in NR, two types of reference signals (RS Types) are defined for Layer 3 (L3) mobility: PBCH/SS Block (SSB or SS Block), which basically comprises synchronization signals equivalent to PSS/SSS in LTE and PBCH/DMRS, and, CSI-RS for L3 mobility, more configurable and configured via dedicated signaling. There are different reasons to define the two RS types, one of them being the possibility to transmit SSBs in wide beams while CSI-RSs in narrow beams.

It has been agreed that in NR the RS type used for RLM is also configurable (both CSI-RS based RLM and SS block based RLM are supported) and, it seems natural that the RS type for RLM should be configured via RRC signaling.

SUMMARY

CSI-RS based RLM is more flexible as it could be UE specific, and more accurate than SSB, especially for various MIMO configurations, One example of MIMO is multiple Transmitting and Receiving Point (TRP) in Heterogeneous configuration, which means multiple-TRP will share a single cell ID, but are geography distributed. Normally a one-TRP will serve as macro for cell coverage and a multiple-TRP will serve for hot spot capacity increase.

In such a configuration, one possible solution is that the both types of TRPs use SSB and same cell ID, while intra-cell or inter-TRP Hand Over (HO) is triggered by UE specific CSI-RS based RLM instead of cell specific SSB based RLM.

Due to big bandwidth and high throughput characteristics of NR, power consumption of Base Stations (BS) in NR is great, and thus power saving should be considered. It is noted that power saving is generally not applied to cell coverage providing function element for the sake of cell coverage stability, but may be applied to hot spot capacity increase function element, as traffic isn't always on for e.g. multiple-TRP or Het Net scenario.

Power saving at eNB for LTE is of cell level or semi-static, wherein UEs are notified of the power saving. Power saving at gNB for NR is generally of short time level such as Transmission Time Interval (TTI) level, wherein the power saving duration is so short that the gNB has got no chance to notify UEs. Such short time duration of power saving may introduce flexibility for the gNB, as the gNB may determine at each short time interval whether any traffic transmission is required and switch off at least some radio transmission components such as power amplifier accordingly. However, new issues may also arise, for example, CSI-RS becomes unavailable for RLM at UEs during the power saving. The absence of CSI-RS may undermine RLM at UEs and result in improper radio resource management such as handover.

It is one or more object(s) of the present disclosure to address one or more of the problems arisen in power saving.

According to a first aspect of the disclosure, a method for a Base Station in a communication network is provided. The method comprises: obtaining channel quality information sent from a User Equipment (UE), and in response to determining that the UE is in poor coverage according to the channel quality information, configuring the UE to perform downlink measurements on at least one downlink RLM measurement source in accordance with measurement configurations.

In an example, the method may further comprise: determining that the at least one downlink RLM measurement source is unavailable, wherein the obtaining is in response to the determining.

In an example, the determining that the at least one downlink RLM measurement source is unavailable may further comprise any of the following: in response to determining that the BS is in power saving mode, determining that the at least one downlink RLM measurement source is unavailable, or in response to determining that the BS is in over-heating protection mode, determining that the at least one downlink RLM measurement source is unavailable.

In an example, the obtaining may further comprise: checking time information of the channel quality information with time when the at least one downlink RLM measurement source is available, and choosing the channel quality information of which the time information matches the time when the at least one downlink RLM measurement source is available.

In an example, a duration when the at least one downlink RLM measurement source is unavailable may be on a level of intervals of the at least one downlink RLM measurement source.

In an example, a duration when the at least one downlink RLM measurement source is unavailable may be on a Transmission Time Interval, TTI, level.

In an example, the determining that the UE is in poor coverage, may further comprise: performing layer 3 filtering of result of the channel quality information, and in response to filtered result being below a predetermined threshold, determining that the UE is in poor coverage.

In an example, the method may further comprise: enabling the at least one downlink RLM measurement source.

In an example, the method may further comprise one of the following accordingly: enabling the at least one downlink RLM measurement source by disabling the power saving mode, or enabling the at least one downlink RLM measurement source by disabling the over-heating protection mode.

In an example, the method may further comprise: in response to receiving a message from the UE indicating that the UE is in good coverage, removing the measurement configurations from the UE.

In an example, the at least one downlink RLM measurement source may be UE specific.

In an example, the at least one downlink RLM measurement source may comprise Channel State Information Reference Signal (CSI-RS).

In an example, the channel quality information may comprise Channel Quality Indicator (CQI) sent in a MAC layer control message.

In an example, at least reporting configurations of the measurement configurations on the at least one downlink RLM measurement source may be disabled before the determining that the UE is in poor coverage.

In an example, the communication network may comprise a next generation network.

According to a third aspect of the disclosure, there is provided a Base Station (BS) operative in a communication network, The BS comprises: an obtaining component configured to obtain channel quality information sent from a UE; and a measurement configuring component configured to configure the UE to perform downlink measurements on at least one downlink RLM measurement source in accordance with measurement configurations, in response to determining that the UE is in poor coverage according to the channel quality information.

According to a third aspect of the disclosure, there is provided a communication device in a communication network, comprising: a storage adapted to store instructions therein and a processor adapted to execute the instructions to cause the communication device to perform the steps of any of the methods herein.

According to a fourth aspect of the disclosure, there is provided a computer-readable storage storing computerexecutable instructions thereon, when executed by a computing device, causing the computing device to implement the method of any of any of the methods herein.

According to a fifth aspect of the disclosure, there is provided a computer program, comprising instructions which, when executed on at least one processor, cause the at least one processor to carry out the method according to any one of the methods herein.

According to a sixth aspect of the disclosure, there is provided a carrier containing the computer program of the eighth embodiment, wherein the carrier is one of an electronic signal, optical signal, radio signal, or computer readable storage.

According to an seventh aspect of the disclosure, there is provided an apparatus adapted to perform the method according to any one of the methods herein.

As a whole or by scenario, by introducing channel quality information sent from UEs, unexpected signalings or unnecessary behaviors may be waived off when some downlink RLM source is unavailable, e.g. due to power saving in particular of very short durations. Network KPI and user experience will be enhanced.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

DETAILED DESCRIPTION

Figure 1:
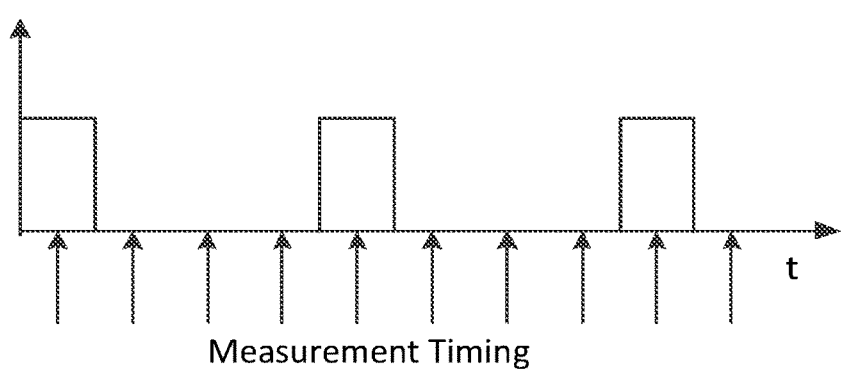
FIG. 1 illustrates a schematic view of sampling of RS with power saving applied.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first request and a second request indicates different requests regardless of the order or importance.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, concepts of RLM, TTI, CSI-RS, procedures and messages etc. are generally understood in the context of 3GPP specifications. Though many embodiments herein are described in the context of Next Generation network (such as 5G mobile wireless networks), other networks may also be applicable. For example, the power saving of TTI level may also be applied in LTE network.

Even though many embodiments are described in the context of power saving, it is noted that embodiments of the present disclosure are not limited to power saving, but also applicable to other scenarios when RLM at UEs are affected due to RS absence as appropriate, for example, when the BS is in over-heating protection mode and some RSs are muted during the mode.

FIG. 1 illustrates a schematic view of sampling of RS with power saving applied. In FIG. 1, the horizontal axis represents time, and the vertical axis represents power mode of a BS, wherein the high level means the BS is in normal working mode in which the UE specific RS such as the CSI-RS is available, and the low level means the BS is in power saving mode in which the UE specific RS such as the CSI-RS is unavailable. Arrows at the bottom represent timing of UE measurement.

The network may configure the UE to perform the following types of measurements: NR measurements, Inter-RAT measurements of E-UTRA frequencies, and Inter-RAT measurements of UTRA-FDD frequencies.

The network may configure the UE to report the following measurement information based on SS/PBCH block(s): Measurement results per SS/PBCH block, Measurement results per cell based on SS/PBCH block(s), and SS/PBCH block(s) indexes.

The network may configure the UE to report the following measurement information based on CSI-RS resources: Measurement results per CSI-RS resource, Measurement results per cell based on CSI-RS resource(s), and CSI-RS resource measurement identifiers.

The measurement configuration includes the following parameters:

1. Measurement objects (MO): a list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

For inter-RAT UTRA-FDD measurements a measurement object is a set of cells on a single UTRA-FDD carrier frequency.

For CBR measurement of NR sidelink communication, a measurement object is a set of transmission resource pool(s) on a single carrier frequency for NR sidelink communication.

For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

In case of conditional reconfiguration, each configuration consists of the following:

Execution criteria: The criteria the UE uses for conditional reconfiguration execution.

RS type: The RS that the UE uses for obtaining beam and cell measurement results (SS/PBCH block-based or CSI-RS-based), used for evaluating conditional reconfiguration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in 3GPP. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

Figure 2:
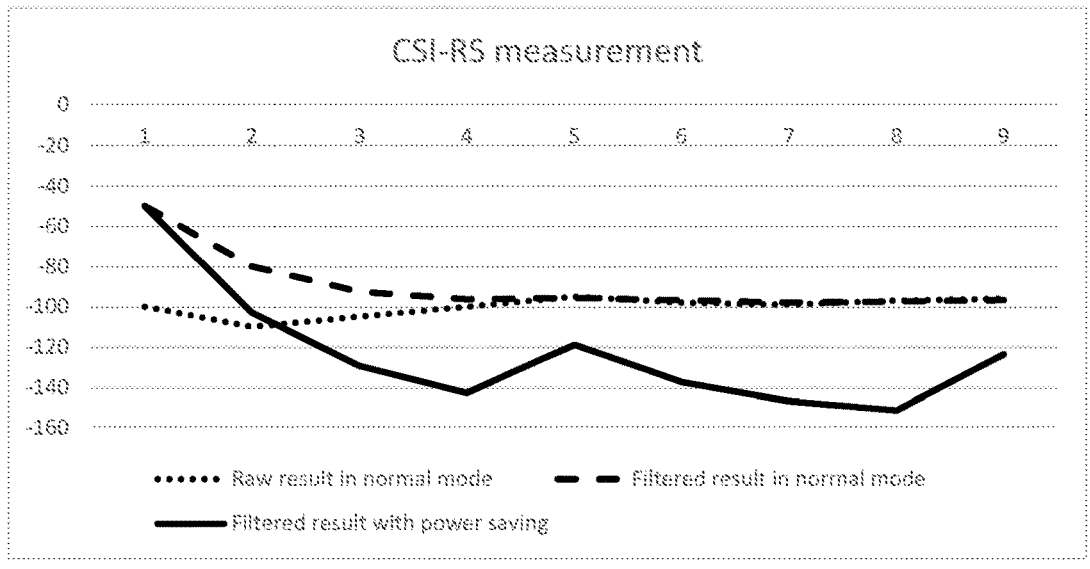
FIG. 2 illustrates a diagram of CRI-RS measurements in comparison regarding power saving.

FIG. 2 illustrates a diagram of CRI-RS measurements in comparison regarding power saving. Once measurement quantity of the CRI-RS is obtained, the UE will apply L3 filtering of the measurement quantity before using it for evaluation of reporting criteria or for measurement reporting, by the following formula:

$$F_n=(1-a)*F_{n-1}+a*M_n \quad (1)$$

where $M_n$ is the latest received measurement result from the physical layer, i.e., measurement quantity of the CRI-RS;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received; and $a=1/2^{(ki/4)}$, where $k_i$ is the filterCoefficient for the corresponding measurement quantity of the i:th QuantityConfigNR in quantityConfigNR-List, and i is indicated by quantityConfigIndex in MeasObjectNR.

For power saving pattern and sampling time shown in FIG. 1 and for filterCoefficient being FC4, data in the following table 1 is obtained, wherein "Raw result in normal mode" represents measurement quantity of the CRI-RS in physical layer without applying power saving in the BS, "Raw result with power saving" represents measurement quantity of the CRI-RS in physical layer with power saving shown in FIG. 1 applied in the BS, "Filtered result in normal mode" represents L3 filtered result by applying formula (1) to the "Raw result in normal mode", and "Filtered result with power saving" represents L3 filtered result by applying formula (1) to the "Raw result with power saving".

TABLE 1

| Raw result in normal mode | Raw result with power saving | Filtered result in normal mode | Filtered result with power saving |
|---|---|---|---|
| −100 | −100 | −50.00 | −50.00 |
| −110 | −156 | −80.00 | −103.00 |
| −105 | −156 | −92.50 | −129.50 |
| −100 | −156 | −96.25 | −142.75 |
| −95 | −95 | −95.63 | −118.88 |
| −98 | −156 | −96.81 | −137.44 |
| −99 | −156 | −97.91 | −146.72 |
| −97 | −156 | −97.45 | −151.36 |
| −96 | −96 | −96.73 | −123.68 |

For intuitively understanding of such data in table 1, FIG. 2 is drawn according to table 1. Taking −130 as a threshold of measurement report, the Filtered result with power saving (see the solid line in FIG. 2) may trigger multiple measurement reports, which may in turn trigger some unexpected behaviors, such as E-UTRA-NR Dual Connectivity (EN-DC), NR CA, and NR-NR Dual Connectivity (NR-DC) behavior, resulting in signaling storm and unnecessary mobility procedure. Therefore, network KPI and UE experience will be affected.

Speaking of EN-DC, Multi-Radio Dual Connectivity (MR-DC) should be introduced, which is a generalization of the Intra-E-UTRA Dual Connectivity (DC) described in 3GPP, where a multiple Rx/Tx capable UE may be configured to utilize resources provided by two different nodes connected via non-ideal backhaul, one providing NR access and the other one providing either E-UTRA or NR access. One node acts as the Master Node (MN)—previously referred to as MeNB, and the other as the Secondary Node (SN)—previously referred to as SN. The MN and SN are connected via a network interface and at least the MN is connected to the core network. In MR-DC, MN is the radio access node that provides the control plane connection to the core network. It may be a Master eNB (in EN-DC), a Master ng-eNB (in NGEN-DC) or a Master gNB (in NR-DC and NE-DC). Still in MR-DC, SN is the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

Figure 3A:
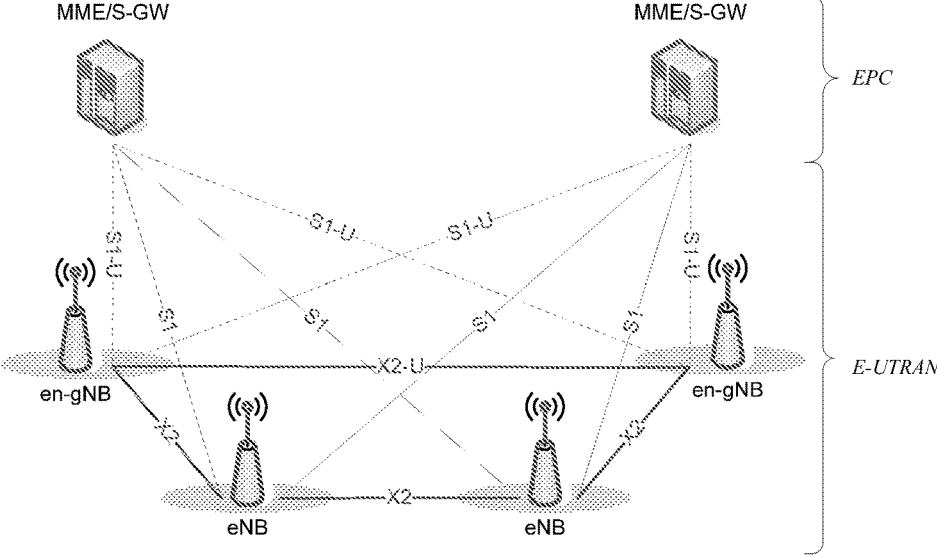
FIG. 3a illustrates an E-UTRA-NR Dual Connectivity architecture according to an exemplary NR network.

E-UTRAN supports MR-DC via EN-DC, in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface. The EN-DC architecture is illustrated in FIG. 3a.

Figure 3B:
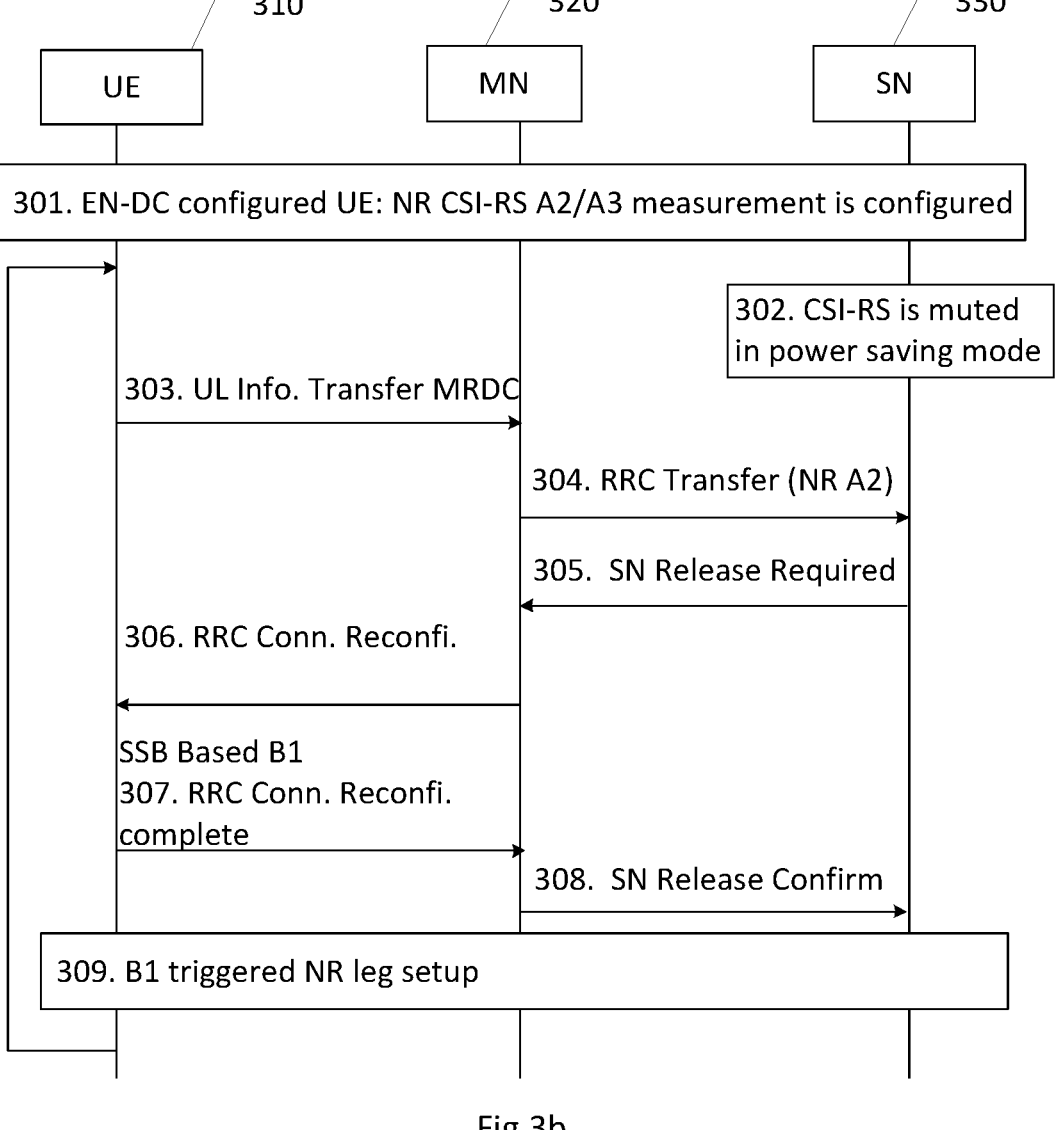
FIG. 3b shows procedure for EN-DC scenario with power saving applied in BS according to an exemplary NR network.

FIG. 3b shows a procedure for EN-DC scenario with power saving applied in BS according to an exemplary 5G network. At step 301, network (comprising MN 320 and SN 330) configures UE 310 to derive RSRP, RSRQ and SINR measurement results associated to NR measurement objects based on parameters configured in the measObject (e.g.

maximum number of beams to be averaged and beam consolidation thresholds) and in the reportConfig-rsType to be measured: CSI-RS, event to be reported: Event A2 (Serving becomes lower than threshold) and A3 (Neighbour becomes offset better than SpCell).

At step 302, in a power saving mode, CSI-RS is muted for a time duration, without notifying the UE 310. In one example, the time duration is of TTI level.

Then referring to FIG. 2, when filtered measurement result satisfies a predetermined condition, e.g. lower than threshold, a configured measurement report may be triggered. Such a measurement report is transmitted to the MN 320 in ULInformationTransferMRDC message via UL information transfer for MR-DC procedure at step 303. The UL information transfer for MR-DC procedure may be initiated by a UE in RRC_CONNECTED whenever there is a need to transfer MR-DC dedicated information, e.g., NR RRC MeasurementReport, UEAssistanceInformation, FailureInformation, RRCReconfigurationComplete or MCGFailureInformation message.

Then at step 304, the MN 320 initiates an RRC Transfer procedure to provide the measurement report to the SN 330. In one example, the event type is A2.

At step 305, the SN 330 initiates an SN release procedure by sending an SN Release Required message which does not contain any inter-node message. At step 308, the MN 320 sends an SN Release Confirm message to the SN 330 to complete the SN release procedure. The SN 330 may stop providing user data to the UE as early as it receives the SN Release Confirm message.

Meanwhile, at step 306, the MN 320 initiates an RRCConnectionReconfiguration message towards the UE that the UE shall release the entire Secondary Cell Group (SCG) configuration. As a response, at step 307, the UE 310 acknowledges with an RRCConnectionReconfigurationComplete message, where Event B1 (Inter RAT neighbour becomes better than threshold) based on SSB is included.

Timing of steps 305-308 may be adapted to minimize gaps in service provision, and is not limited to the order shown in FIG. 3b. Step 308 may also be performed before steps 306 and 307, where data forwarding from the SN 330 is needed, and the MN provides data forwarding addresses to the SN in the SN Release Confirm message at step 308. The order is regarded to be an implementation matter.

As can be seen from steps 303-308, unexpected signallings and unnecessary mobility procedures are triggered due the power saving. Once the SN 330 returns to a normal power consumption mode, a NR leg setup will be performed among the UE 310, the MN 320 and the SN 330 triggered by e.g. Event B1.

Next time the SN 330 gets into power saving mode again, steps 302-309 will happen again. As the power saving duration may be very short, e.g. TTI level, and frequent, steps 302-309 will happen again and again frequently, affecting network and UE experience greatly.

Figure 4:
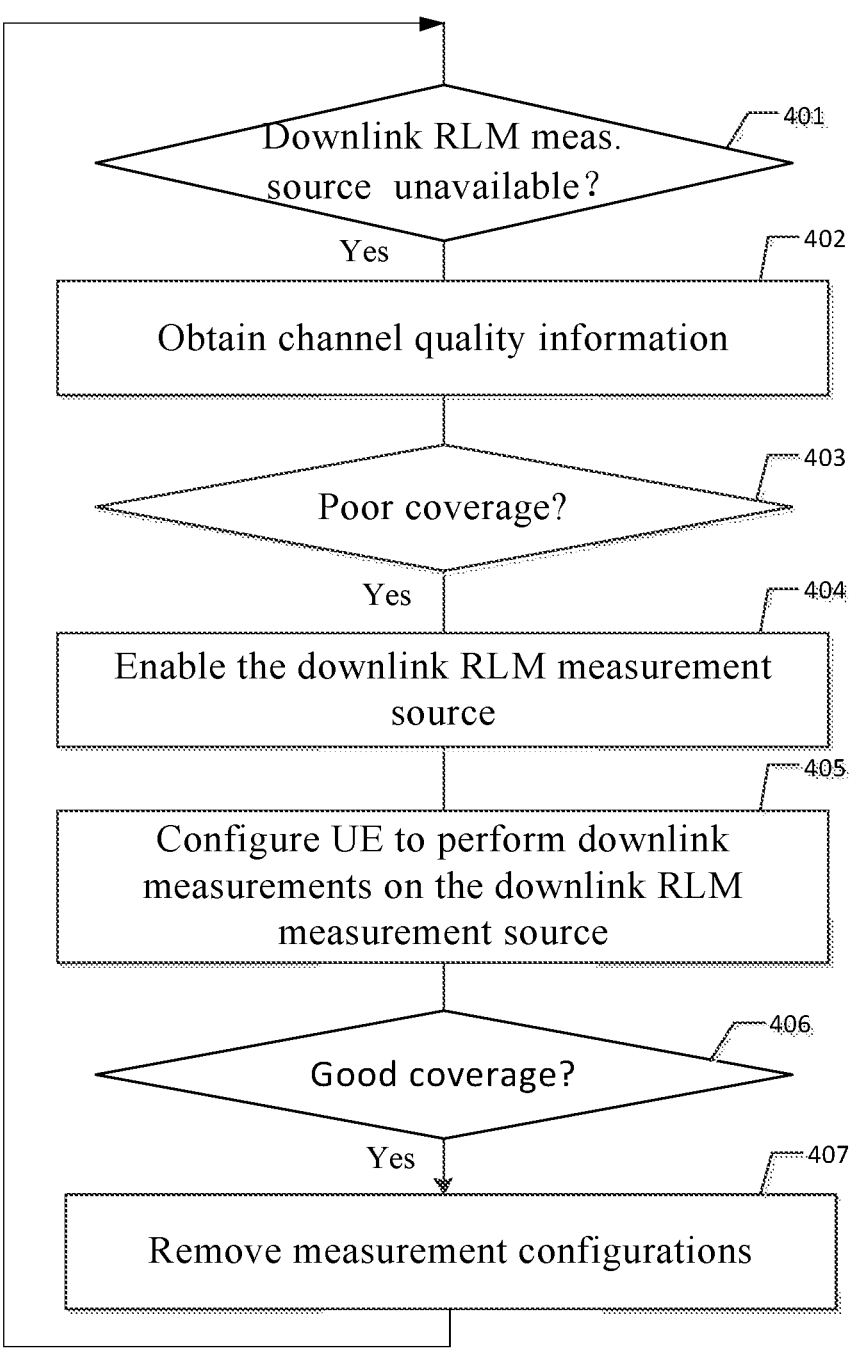
FIG. 4 illustrates a flowchart of an embodiment according to embodiments of the present disclosure.

FIG. 4 illustrates a flowchart of an embodiment according to embodiments of the present disclosure. The method is performed in a BS of, by example but not limited to, a next generation network such as NR. The method may start at step 401, where whether at least one downlink RLM measurement source is unavailable is checked. Cases where the at least one downlink RLM measurement source is unavailable comprise the power saving case. When the BS gets in to power saving mode, some signals, e.g. the UE specific RS, such as CSI-RS, will be muted and thus unavailable. In an example, once the BS gets into power saving mode, it is determined that the at least one downlink RLM measurement source is unavailable. In an example, the time information of the power saving mode comprises duration of the power saving mode or over-heating protection mode. The duration may be very short in NR, e.g., on a level of intervals of the at least one downlink RLM measurement source. In that case, the BS even has got no chance to notify the UE before it gets back to normal power consumption status. In an example, the duration of the power saving mode or over-heating protection mode is on a Transmission Time Interval, TTI, level, and the BS may check the power saving status at each TTI.

In one embodiment, the method may simply skip step 401 and starts at step 402, i.e., be the at least one downlink RLM measurement source unavailable or not (for example, be the BS in power saving mode or not, or be the BS in over-heating protection mode or not), the BS will perform step 402.

If it is determined at step 401 that the at least one downlink RLM measurement source is unavailable, the method proceeds to step 402, where the BS obtains channel quality information sent from a UE. The channel quality information comprises Channel Quality Indicator, CQI.

In an example, the BS checks time information of the channel quality information with time when the at least one downlink RLM measurement source is available, and chooses the channel quality information of which the time information matches the time when the at least one downlink RLM measurement source is available. The CQI may be affected when the at least one downlink RLM measurement source is unavailable. The BS knows when the at least one downlink RLM measurement source is available according to power saving pattern or over-heating protection pattern, so the BS can do the checking, and the chosen CQI may better represent the actual channel quality.

A Layer 3 filter may be applied to the received CQI by applying the following formula, which is the same as formula (1), except meanings of parameters:

$$F_n=(1-a)*F_{n-1}+a*M_n \qquad (2)$$

where
M$_n$ is the latest received measurement result from the physical layer, i.e., measurement quantity of the CQI here;
F$_n$ is the updated filtered measurement result;
F$_{n-1}$ is the old filtered measurement result, where F$_0$ is set to M$_1$ when the first measurement result from the physical layer is received; and a=1/2$^{(ki/4)}$, where k$_i$ specifies the measurement filtering coefficient. Value FC0 corresponds to k$_i$=0, FC1 corresponds to k$_i$=1, and so on. In an example, we use FC4, and thus a=1/2.

If the resultant F$_n$ is below a predetermined threshold, then it is determined that the UE is in poor coverage at step 403.

At step 405, the BS will configure the UE to perform downlink measurements on the at least one downlink RLM measurement source in accordance with measurement configurations. The at least one downlink RLM measurement source comprises UE specific RS, such as CSI-RS. If the at least one downlink RLM measurement source, e.g. UE specific RS, such as CSI-RS is still not available, for example, the BS is still in power saving mode, then the BS will enable the at least one downlink RLM measurement source, e.g. by disabling the power saving mode.

After being configured with the measurement configurations, the UE will act accordingly based on measurements on the at least one downlink RLM measurement source, for example, send an A2 measurement report, an A3 measurement report, etc. once triggered, and the BS will act accordingly, for example, release the SN, change the PScell. The procedures are all defined by 3GPP. It is noted that the UE may obtain a different measurement result from the BS, indicating that the UE is in good coverage. In response to receiving a message from the UE indicating that the UE is in good coverage at step 406, the BS will at step 407 remove the measurement configurations from the UE, for example, remove the configured measurement object, reporting configuration such as Event A2, A3, etc., so that next time the at least one downlink RLM measurement source is unavailable due to for example power saving or over-heating protection, unexpected signalings and unnecessary behaviors will be waived off.

A presumption to ensure proper action of the method is that at least reporting configurations of the measurement configurations on the at least one downlink RLM measurement source are disabled before step 403. So the UE will at least not trigger any unexpected measurement report and thus not causing unexpected signalings and unnecessary behaviors.

As the power saving mode goes on, the method will proceed back to step 401, for the next round measurement.

Figure 5A:
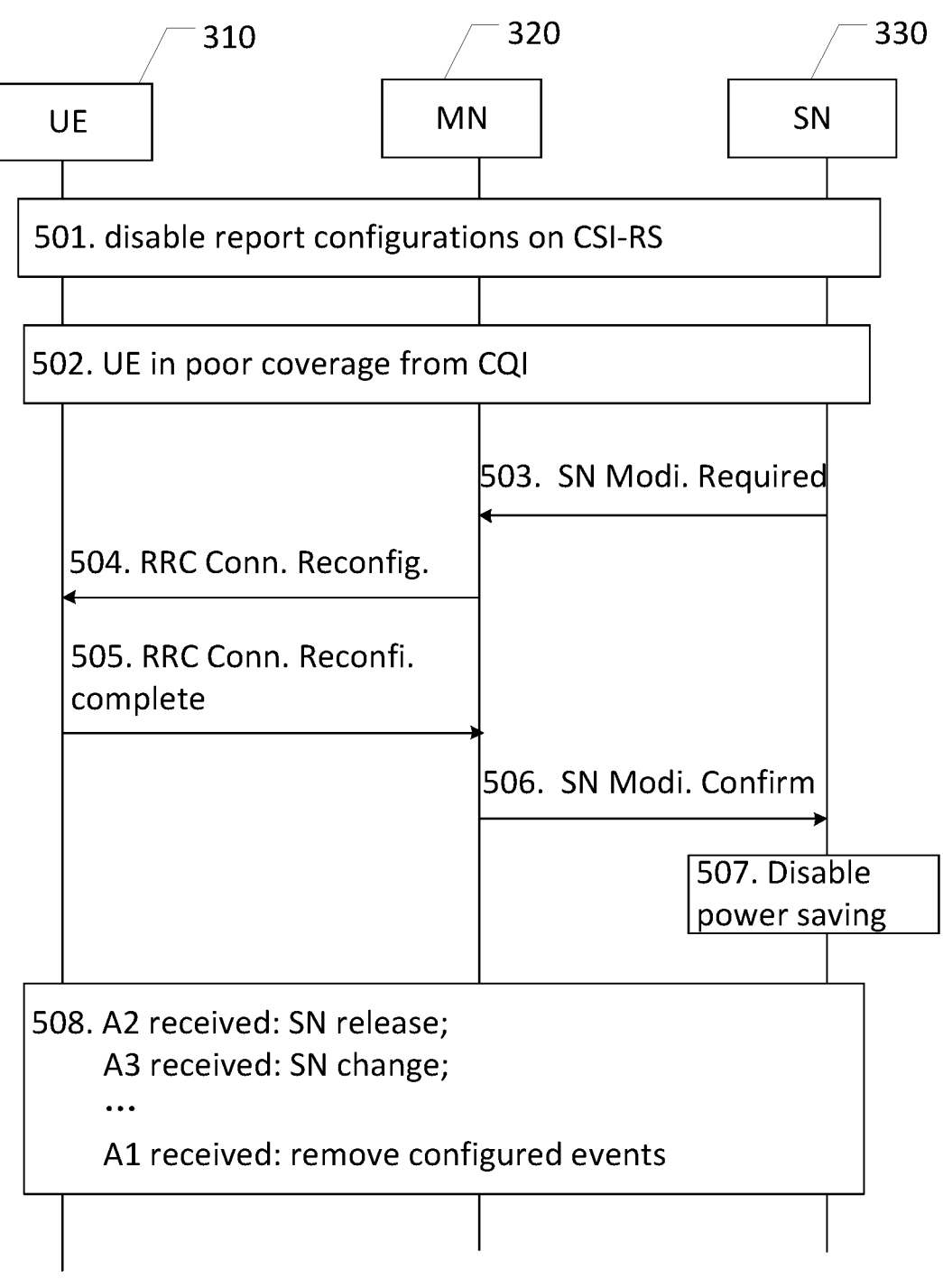
FIGS. 5a-5c illustrate procedures of embodiments in different scenarios according to embodiments of the present disclosure.
Figure 5B:
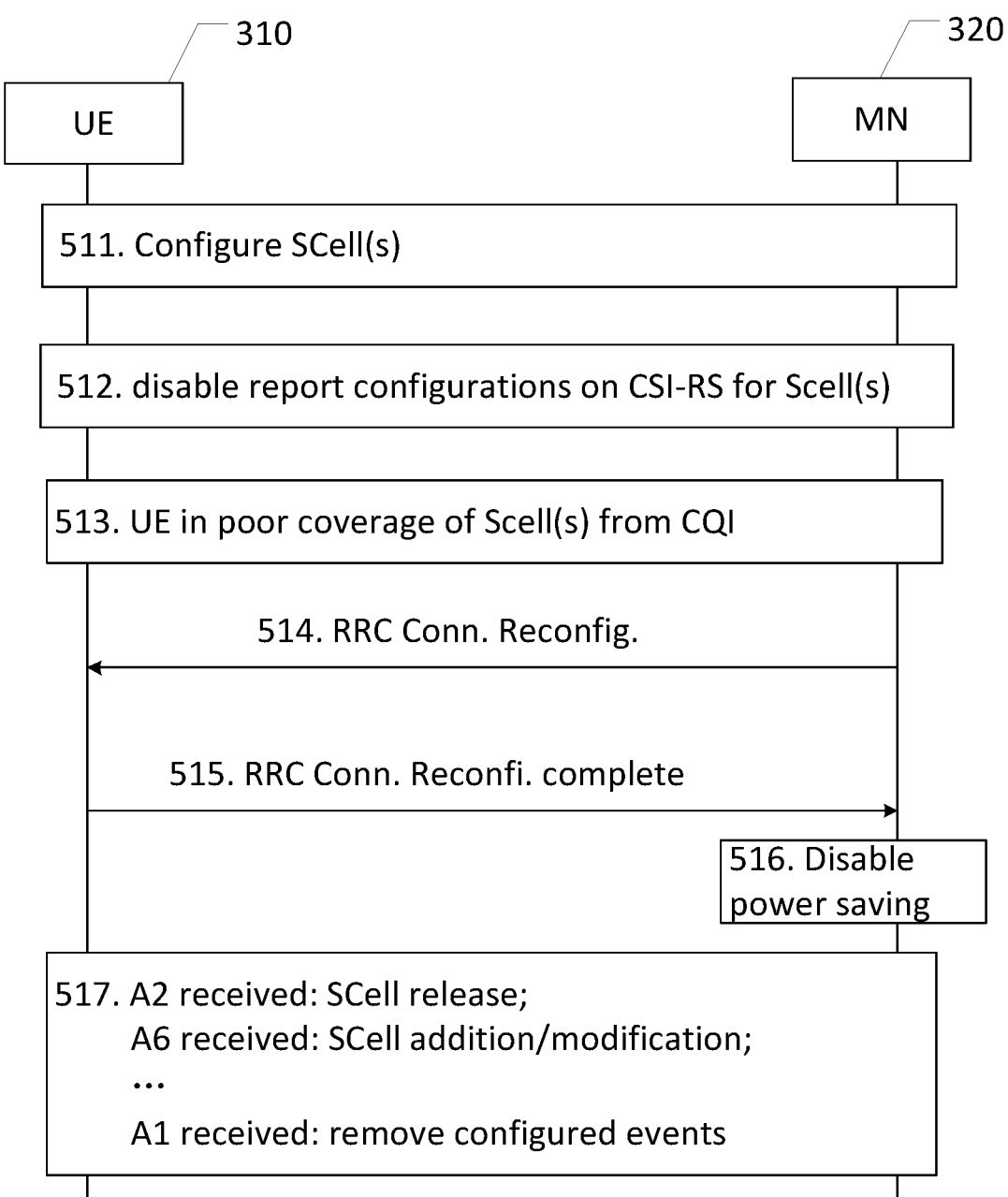
Figure 5C:
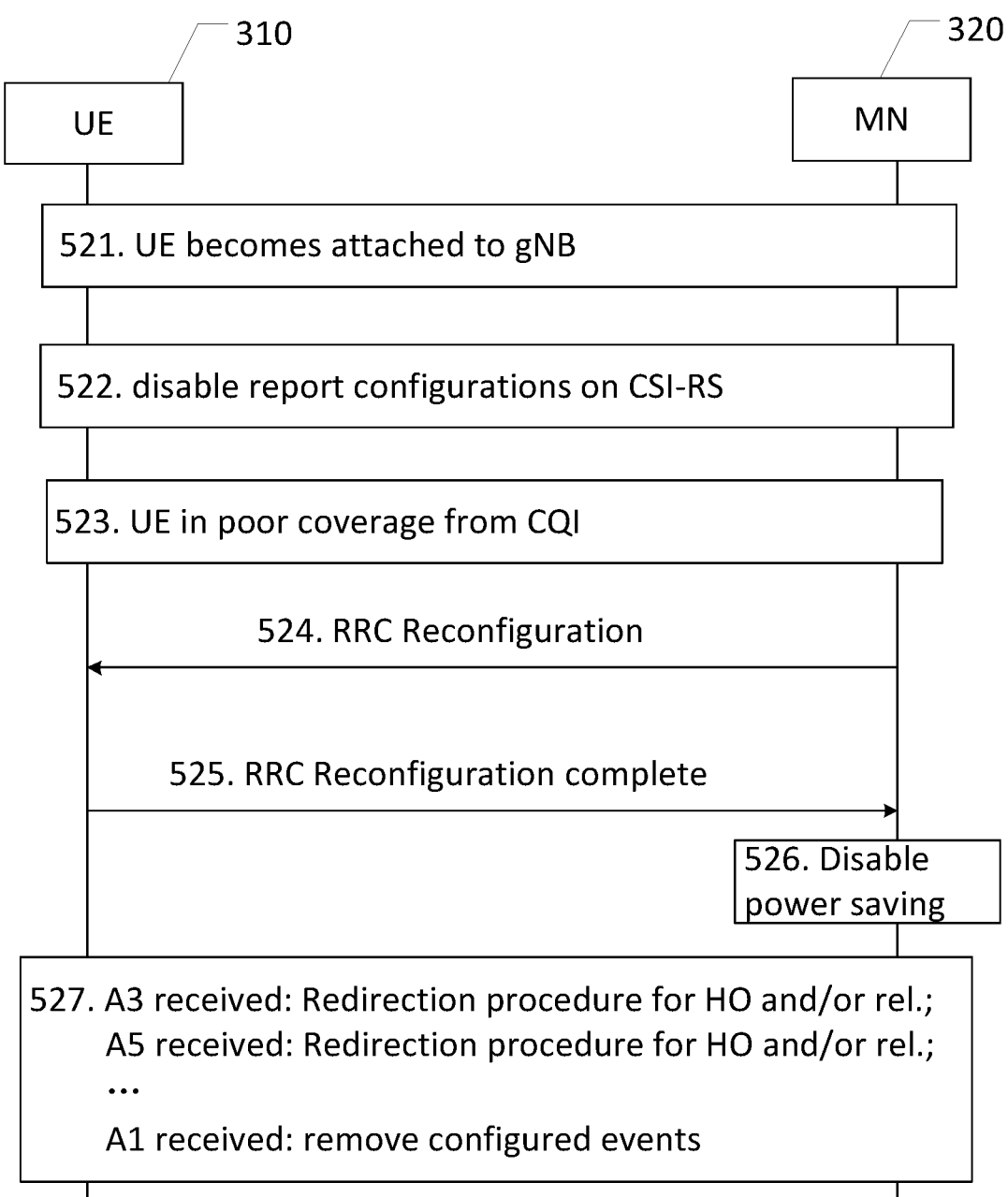

FIGS. 5a-5c illustrate procedures of embodiments in different scenarios according to embodiments of the present disclosure. FIG. 5a shows a procedure for EN-DC scenario with power saving applied in SN according to embodiments of the present disclosure. At step 501, measurement configurations may be performed, but at least reporting configurations of the measurement configurations on CSI-RS are disabled. The network (comprising MN 320 and SN 330) may not configure UE 310 regarding measurements on CSI-RS, or at least parameters in the reportConfig such as Reporting criterion (event) on CSI-RS should not be configured at the moment before the following steps.

At step 502, the SN 330 obtain CQIs sent from the UE 310 in MAC layer control messages and obtains filtered measurement results respectively according to formula (2). At least one of the filtered measurement result in SN satisfies a predetermined condition, e.g. lower than a threshold, indicates that the UE 310 is in poor coverage of the SN 330.

Then a measurement configuration for the UE on CRI-RS, at least the reporting configurations, such as Reporting criterion—A1, A2 and A3, will be triggered. The configuration will be done via an NR RRC message. Generally, The SN initiates an SN modification procedure when it needs to transfer an NR RRC message to the UE, so at step 503, the SN 330 initiates an SN modification procedure by sending an SN modification required message to the MN 320, and at step 504 the MN 320 forwards the NR RRC message to the UE 310 in the RRCConnectionReconfiguration message.

The UE applies the new configuration and replies with the RRCConnectionReconfigurationComplete message at step 505. Then the MN forwards the NR RRC response message, if received from the UE, to the SN in the SN Modification Confirm message at step 506.

In an example, the SN 330 may be in a power saving mode, and CRI-RS may not be transmitted as the UE expects. In this case, the SN 330 should disable the power saving mode at step 507, and transmits CRI-RS as usual.

Now the UE 310 can perform downlink measurement on CRI-RS from the SN 330. At step 508, for example, according to 3GPP, in case an event A2 report is received, the SN 330 will initiate an SN release procedure; in case an event A3 report is received, the SN 330 will initiate an SN change procedure, etc.

It is noted that in case an event A1 report is received, indicating that the UE is in good coverage, the SN 330 will remove the measurement configurations made in steps 503-506, for example, remove the configured measurement object, reporting configuration such as Event A1, A2, A3, etc., so that next time CSI-RS becomes unavailable due to for example power saving, unexpected signalings and unnecessary behaviors will be waived off.

FIG. 5b shows a procedure for Carrier Aggregation (CA) scenario with power saving applied in MN according to embodiments of the present disclosure. CA uses a plurality of carriers comprising a primary component carrier and a secondary component carrier. The primary carrier, which is a core of management upon using plural component carriers, is defined by one for each UE. Other component carriers except for the one primary carrier are defined as secondary component carriers. In general, the primary carrier serves as a core carrier for managing the entire aggregated component carriers, and the other secondary carriers may have high probability to provide additional frequency resources for ensuring higher data rate. For example, a radio resource control connection for signaling with a UE may be carried out by the primary carrier. The primary cell (Pcell) may operate on a primary frequency or primary component carrier, in which the UE either performs the initial connection establishment procedure or initiates the connection re-establishment procedure, or the cell indicated as the primary cell in the handover procedure. The secondary cell (Scell) may operate on a secondary frequency or a secondary component carrier, which may be configured once Radio Resource Control (RRC) connection is established, and may be useable to provide additional radio resources. At step 511, At least one SCell is configured after the UE 310 accesses the network. At step 512, measurement configurations for the at least one SCell may be performed, but at least reporting configurations of the measurement configurations on CSI-RS of the at least one SCell are disabled. The MN 320 may not configure UE 310 regarding measurements on CSI-RS, or at least parameters in the reportConfig such as Reporting criterion (event) on CSI-RS should not be configured at the moment before the following steps.

At step 513, the MN 320 obtains CQIs sent from the UE 310 in MAC layer control messages and obtains filtered measurement results respectively according to formula (2). At least one of the filtered measurement results in SN satisfies a predetermined condition, e.g. lower than a threshold, indicates that the UE 310 is in poor coverage of the corresponding SCell.

Then a measurement configuration for the UE on CRI-RS, at least the reporting configurations, such as Reporting criterion—e.g. A1, A2 and A6 (Neighbour becomes offset better than SCell), will be triggered. The configuration will be done via an NR RRC message—the RRCConnectionReconfiguration message at step 514.

The UE applies the new configuration and replies with the RRCConnectionReconfigurationComplete message at step 515.

In an example, the SN 330 may be in a power saving mode, and CRI-RS may not be transmitted as the UE expects. In this case, the SN 330 should disable the power saving mode at step 516, and transmits CRI-RS as usual.

Now the UE 310 can perform downlink measurement on CRI-RS for one or more of the at least one SCell. At step 517, for example, according to 3GPP, in case an event A2 report is received, the MN 320 will initiate an SCell release procedure; in case an event A6 report is received, the MN 320 will initiate an SCell addition/modification procedure, etc.

It is noted that in case an event A1 report is received, indicating that the UE is in good coverage of an SCell, the SN 330 will remove the measurement configurations made in steps 514-515, for example, remove the configured measurement object, reporting configuration such as Event e.g. A1, A2, A6, etc., so that next time CSI-RS becomes unavailable due to for example power saving, unexpected signalings and unnecessary behaviors will be waived off.

FIG. 5c shows a procedure for mobility scenario with power saving applied in gNB according to embodiments of the present disclosure. At step 521, UE 310 becomes attached to gNB 340. At step 522, measurement configurations may be performed, but at least reporting configurations of the measurement configurations on CSI-RS are disabled. The gNB 340 may not configure UE 310 regarding measurements on CSI-RS, or at least parameters in the reportConfig such as Reporting criterion (event) on CSI-RS should not be configured. Accordingly, default reporting configurations of measurement configuration on CSI-RS should be disabled.

At step 523, the gNB 340 obtains CQIs sent from the UE 310 in MAC layer control messages and obtains filtered measurement results respectively according to formula (2). At least one of the filtered measurement results in gNB 340 satisfies a predetermined condition, e.g. lower than a threshold, indicates that the UE 310 is in poor coverage of the gNB 340.

Then a measurement configuration for the UE on CRI-RS, at least the reporting configurations, such as Reporting criterion—e.g. A1, A3 and A5 (SpCell becomes worse than threshold1 and neighbour becomes better than threshold2), will be triggered. The configuration will be done via an NR RRC message—e.g. the RRCReconfiguration message at step 524.

The UE applies the new configuration and replies with e.g. the RRCReconfigurationComplete message at step 525.

In an example, the SN 330 may be in a power saving mode, and CRI-RS may not be transmitted as the UE expects. In this case, the SN 330 should disable the power saving mode at step 526, and transmits CRI-RS as usual.

Now the UE 310 can perform downlink measurement on CRI-RS. At step 527, for example, according to 3GPP, in case an event A3 report is received, the gNB 340 will initiate a redirection procedure for handover and/or release; in case an event A5 report is received, the gNB 340 will initiate a redirection procedure for handover and/or release, etc.

It is noted that in case an event A1 report is received, indicating that the UE is in good coverage, the gNB 340 will remove the measurement configurations made in steps 524-525, for example, remove the configured measurement object, reporting configuration such as Event e.g. A1, A3, A5, etc., so that next time CSI-RS becomes unavailable due to for example power saving, unexpected signalings and unnecessary behaviors will be waived off.

It is noted that the order of the steps described above are not limited to the sequence of describing them but may be varied as appropriate, unless otherwise indicated. For Example, step 507 is not limited to be performed after step 506, but could be performed anytime between steps 502 and 508.

FIG. 6a illustrates a schematic block diagram of a BS operative in a communication network according to embodiments of the present disclosure. The BS may be any BS in 2G, 3G, 4G and next generation network, such as a BTS, NB, gNB, MN, SN, eNB, etc. The communication network here may be a next generation network such as a 5G network, a 5G network in combination with a 4G network, or any other appropriate network.

The part of the BS which is most affected by the adaptation of the herein described method, e.g., a part of the method described with reference to FIGS. 4, 5a, 5b and 5c, is illustrated as an arrangement 611, surrounded by a dashed line. The BS 61 and arrangement 611 may be further configured to communicate with other network entities such as a UE via a communication component 612 which may also be regarded as part of the arrangement 611 (now shown). The communication component 612 comprises means for communication. The arrangement 611 or the BS 61 may further comprise a further functionality 614, such as functional components providing regular BS functions, and may further comprise one or more storage(s) 613.

The arrangement 611 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIGS. 4, 5a, 5b and 5c. The arrangement 611 of the BS may be implemented and/or described as follows.

Figure 6:
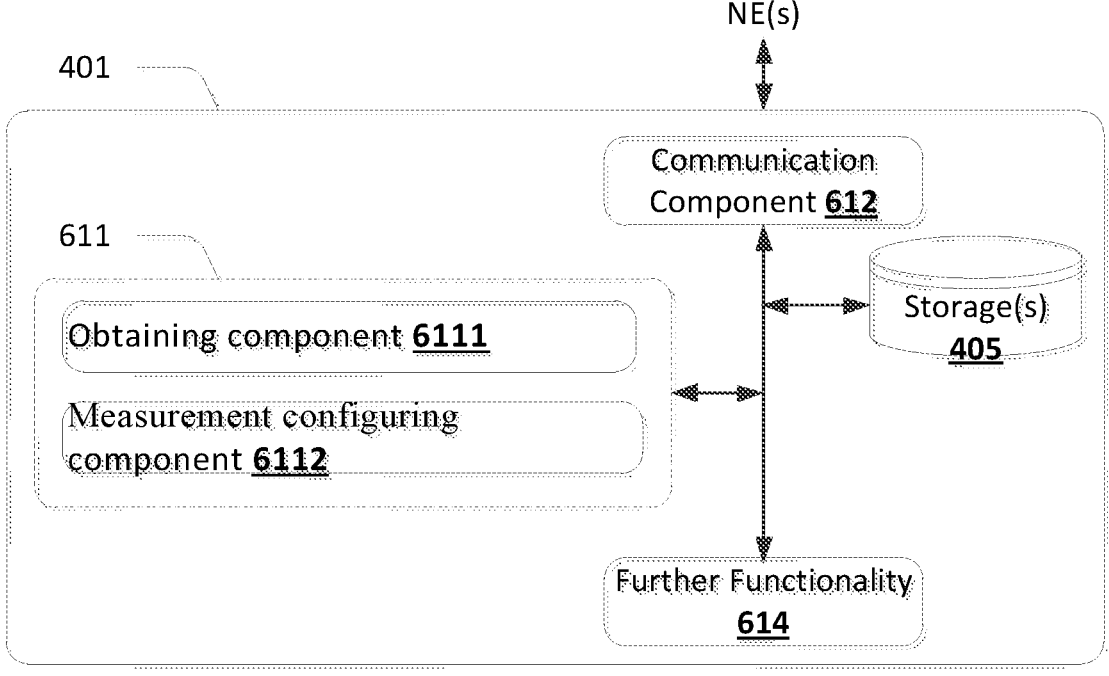
FIG. 6 illustrates a schematic block diagram of a BS according to embodiments of the present disclosure.

Referring to FIG. 6, the BS may comprise an obtaining component 6111 and a measurement configuring component 6112. The obtaining component 6111 is configured to obtain channel quality information sent from a UE, and the measurement configuring component 6112 is configured to configure the UE to perform downlink measurements on at least one downlink RLM measurement source in accordance with the channel quality information, in response to determining that the UE is in poor coverage according to the channel quality information.

It should be noted that the two different components in this disclosure may be logically or physically combined.

Figure 7:
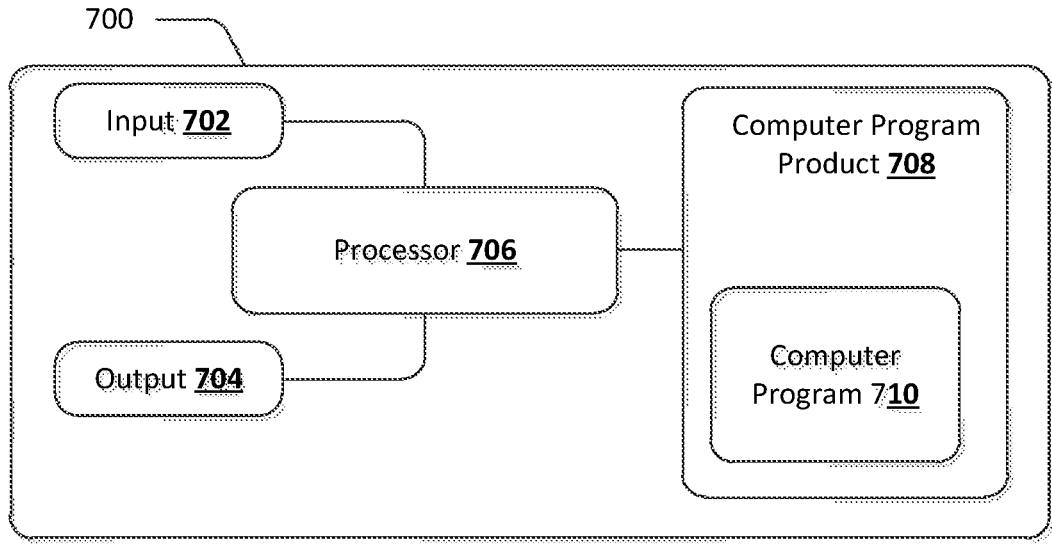
FIG. 7 schematically illustrates an embodiment of an arrangement which may be used for network elements of the present disclosure.

FIG. 7 schematically shows an embodiment of an arrangement 700 which may be used in the BS or the network function selection network element. Comprised in the arrangement 700 are here a processor 706, e.g., with a Digital Signal Processor (DSP). The processor 706 may be a single unit or a plurality of units to perform different actions of procedures described herein. The arrangement 700 may also comprise an input unit 702 for receiving signals from other entities, and an output unit 704 for providing signal(s) to other entities. The input unit and the output unit may be arranged as an integrated network element or as illustrated in the example of FIG. 7.

Furthermore, the arrangement 700 comprises at least one computer program product 708 in the form of a non-volatile or volatile memory, e.g., an Electrically Erasable Programmable Read-Only Memory (EEPROM), a flash memory and a hard drive, and those from a network or a cloud connected via the input unit 702 and output unit 704. The computer program product 708 comprises a computer program 710, which comprises code/computer readable instructions, which when executed by the processor 706 in the arrangement 700 causes the arrangement 700 and/or the BS to perform the actions, e.g., of the procedure described earlier in conjunction with FIGS. 4, 5a, 5b and 5c.

The computer program 710 may be configured as a computer program code structured in computer program modules. Hence, in an exemplifying embodiment when the arrangement 700 is used in the BS, the code in the computer program of the arrangement 700 when executed, will cause the processor 706 to perform the steps as described with reference to FIGS. 4, 5b and 5c.

The processor 706 may be a single Central Processing Unit (CPU), but could also comprise two or more processing units. For example, the processor 706 may include general purpose microprocessors, instruction set processors and/or related chip sets and/or special purpose microprocessors such as Application Specific Integrated Circuits (ASIC). The processor 706 may also comprise board memory for caching purposes. The computer program 710 may be carried by a computer program product 708 connected to the processor 706. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

As a whole or by scenario, by introducing channel quality information sent from UEs, unexpected signalings or unnecessary behaviors may be waived off when some downlink RLM source is unavailable, e.g. due to power saving in particular of very short durations. Network KPI and user experience will be enhanced.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a Base Station, BS, in a communication network, comprising:
   obtaining channel quality information sent from a User Equipment, UE; and
   in response to determining that the UE is in poor coverage according to the channel quality information, configuring the UE to perform downlink measurements on at least one downlink RLM measurement source in accordance with measurement configurations;
   wherein at least reporting configurations of the measurement configurations on the at least one downlink RLM measurement source are disabled before the determining that the UE is in poor coverage.

2. The method of claim 1, further comprising:
   determining that the at least one downlink RLM measurement source is unavailable,
   wherein the obtaining is in response to the determining that the at least one downlink RLM measurement source is unavailable.

3. The method of claim 2, wherein the determining that the at least one downlink RLM measurement source is unavailable further comprises any of the following:
   in response to determining that the BS is in power saving mode, determining that the at least one downlink RLM measurement source is unavailable, or
   in response to determining that the BS is in over-heating protection mode, determining that the at least one downlink RLM measurement source is unavailable.

4. The method of claim 2, wherein the obtaining further comprises:
   checking time information of the channel quality information with time when the at least one downlink RLM measurement source is available, and choosing the channel quality information of which the time information matches the time when the at least one downlink RLM measurement source is available.

5. The method of claim 2, wherein a duration when the at least one downlink RLM measurement source is unavailable is on a level of intervals of the at least one downlink RLM measurement source.

6. The method of claim 2, wherein a duration when the at least one downlink RLM measurement source is unavailable is on a Transmission Time Interval, TTI, level.

7. The method of claim 1, wherein the determining that the UE is in poor coverage, further comprises:
   performing layer 3 filtering of result of the channel quality information, and
   in response to filtered result being below a predetermined threshold, determining that the UE is in poor coverage.

8. The method of claim 1, further comprising:
   enabling the at least one downlink RLM measurement source.

9. The method of claim 3, further comprising one of the following accordingly:
   enabling the at least one downlink RLM measurement source by disabling the power saving mode, or
   enabling the at least one downlink RLM measurement source by disabling the over-heating protection mode.

10. The method of claim 1, further comprising:
    in response to receiving a message from the UE indicating that the UE is in good coverage, removing the measurement configurations from the UE.

11. The method of claim 1, wherein the at least one downlink RLM measurement source is UE specific.

12. The method of claim 1, wherein the at least one downlink RLM measurement source comprises Channel State Information Reference Signal, CSI-RS.

13. The method of claim 1, wherein the channel quality information comprises Channel Quality Indicator, CQI sent in a MAC layer control message.

14. The method of claim 1, wherein the communication network comprises a next generation network.

15. A communication device in a communication network, comprising:
    a storage, adapted to store instructions therein;
    a processor, adapted to execute the instructions to cause the communication device to perform:
    obtaining channel quality information sent from a User Equipment, UE; and
    in response to determining that the UE is in poor coverage according to the channel quality information, configuring the UE to perform downlink measurements on at least one downlink RLM measurement source in accordance with measurement configurations;
    wherein at least reporting configurations of the measurement configurations on the at least one downlink RLM measurement source are disabled before the determining that the UE is in poor coverage.

16. The communication device of claim 15, the processor is adapted to execute the instructions to cause the communication device to perform of:
    determining that the at least one downlink RLM measurement source is unavailable, wherein the obtaining is in response to the determining that the at least one downlink RLM measurement source is unavailable.

17. The communication device of claim 16, the processor is adapted to execute the instructions to cause the communication device to perform of:

in response to determining that the BS is in power saving mode, determining that the at least one downlink RLM measurement source is unavailable, or in response to determining that the BS is in over-heating protection mode, determining that the at least one downlink RLM measurement source is unavailable.

18. The communication device of claim 16, the processor is adapted to execute the instructions to cause the communication device to perform of:

checking time information of the channel quality information with time when the at least one downlink RLM measurement source is available, and choosing the channel quality information of which the time information matches the time when the at least one downlink RLM measurement source is available.

19. The communication device of claim 18, wherein a duration when the at least one downlink RLM measurement source is unavailable is on a level of intervals of the at least one downlink RLM measurement source.

20. A method for a Base Station, BS, in a communication network, comprising:

obtaining channel quality information sent from a User Equipment, UE;

in response to determining that the UE is in poor coverage according to the channel quality information, configuring the UE to perform downlink measurements on at least one downlink RLM measurement source in accordance with measurement configurations;

determining that the at least one downlink RLM measurement source is unavailable, wherein the obtaining is in response to the determining that the at least one downlink RLM measurement source is unavailable;

wherein the determining that the at least one downlink RLM measurement source is unavailable further comprises any of the following:

in response to determining that the BS is in power saving mode, determining that the at least one downlink RLM measurement source is unavailable, or in response to determining that the BS is in over-heating protection mode, determining that the at least one downlink RLM measurement source is unavailable.

* * * * *